March 12, 1963 N. H. LIBERTY 3,080,968
PRODUCT ALIGNING CONVEYOR
Filed Aug. 25, 1961 3 Sheets-Sheet 1
FIG_1
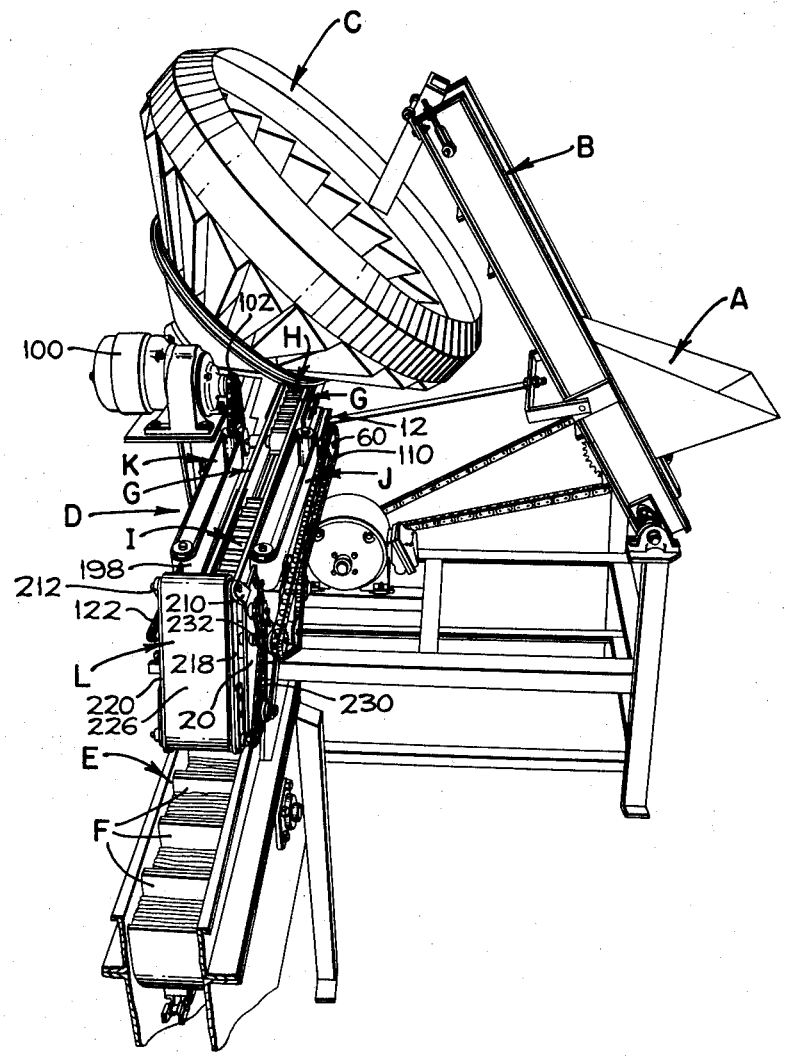
INVENTOR
NORMAN H. LIBERTY
BY *Hans G. Hoffmeister*
ATTORNEY

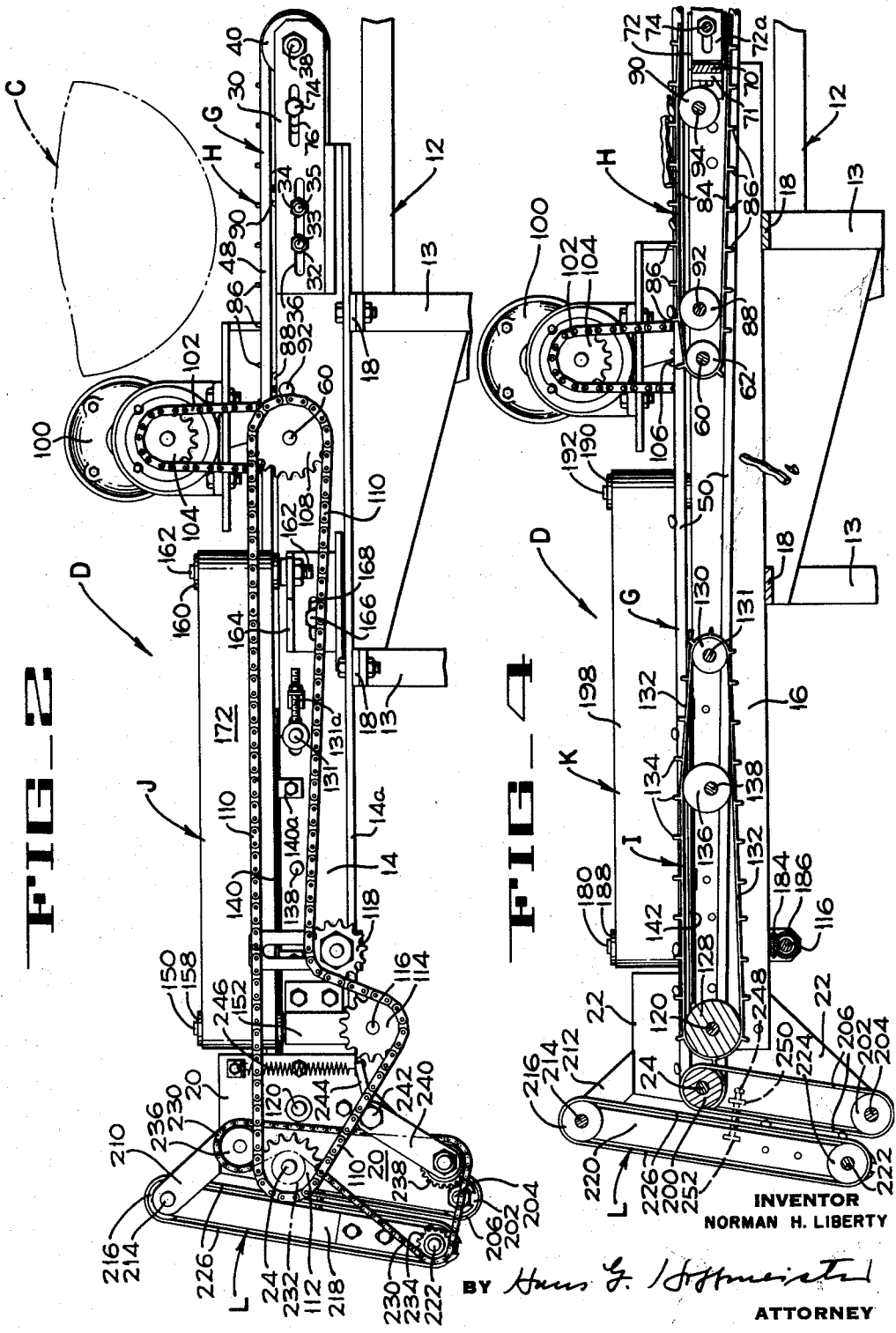

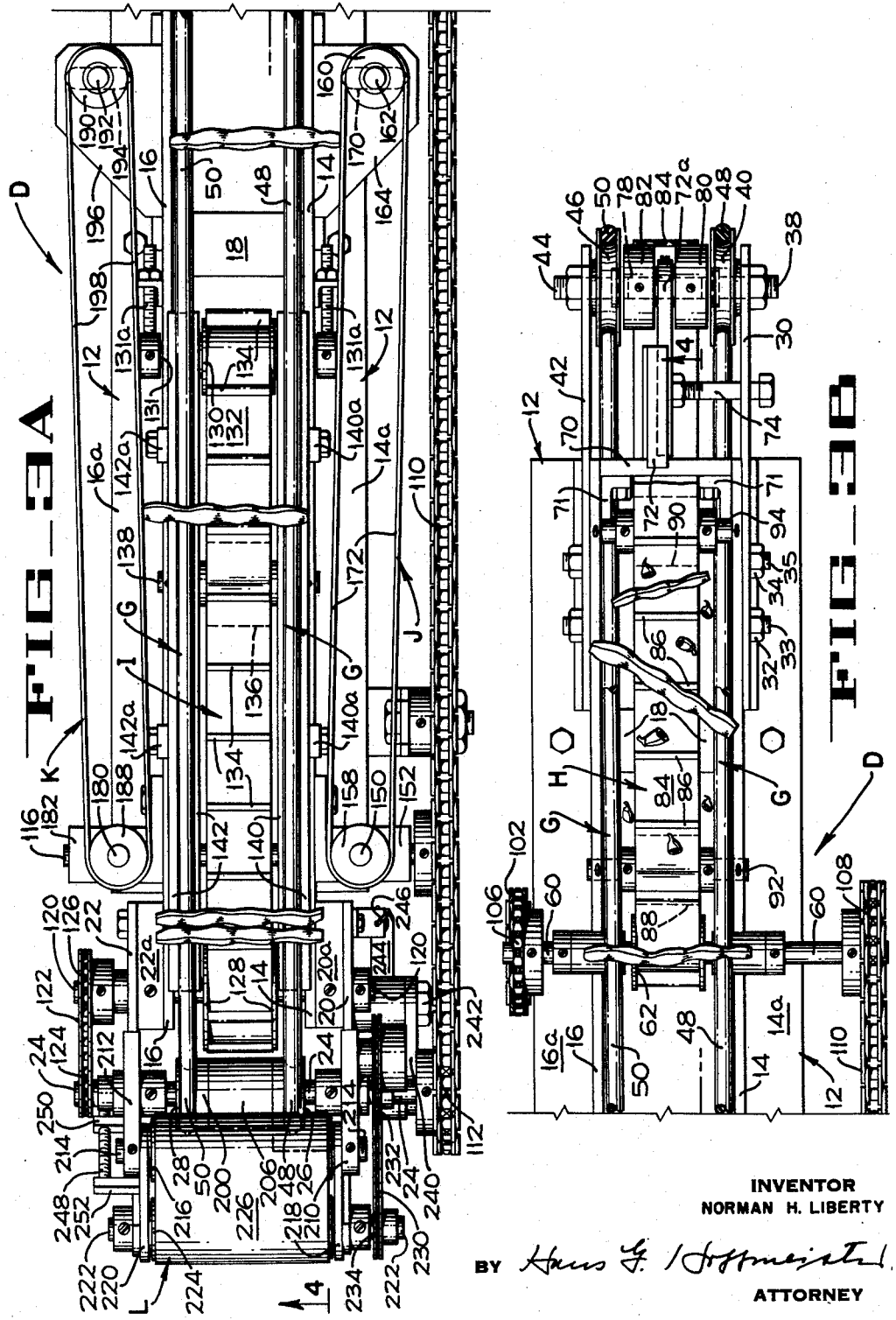

United States Patent Office 3,080,968
Patented Mar. 12, 1963

3,080,968
PRODUCT ALIGNING CONVEYOR
Norman H. Liberty, Portland, Oreg., assignor to FMC Corporation, San Jose, Calif., a corporation of Delaware
Filed Aug. 25, 1961, Ser. No. 133,901
10 Claims. (Cl. 209—82)

This invention relates to machinery for conveying and aligning elongate products and more particularly concerns aligner conveyors for beans of the type commonly called string beans, asparagus, weiners, and other objects of elongate nature.

An object of the present invention is to provide an improved machine for transporting elongate objects and for aligning the elongate objects during their transportation.

Another object of the invention is to sort and align elongate objects and to transport the objects in rapid succession to a take-away conveyor.

Another object of the invention is to provide a machine for transporting elongate objects from an end cutter to a cup conveyor that leads to a canner, which machine includes a means for aligning and centering the elongate objects, and further includes means for rejecting objects which are too short, or which are so positioned that they cannot be aligned.

These and other objects and advantages of the invention will be apparent from the description and from the accompanying drawings, wherein:

FIG. 1 is a perspective of the aligner conveyor of the present invention.

FIG. 2 is a side elevation of the aligning machine of FIG. 1, illustrating the motor and drive chains which drive the various parts of the machine.

FIGS. 3A and 3B together are a plan of the aligning machine illustrated in FIGS. 1 and 2.

FIG. 4 is a vertical section taken on line 4—4 of FIGS. 3A and 3B.

The invention is described in connection with aligning string beans to be canned but it should be recognized that other products of elongate nature can be aligned with the present machine.

When processing beans it is first necessary to cut approximately one-half inch off each end of each bean. The beans are then sorted according to length so that no short beans will be included in the beans which make up the top grade pack. These short beans are separated from the rest of the beans, processed separately and are usually cut up and sold as cut beans. The longer, standard length beans are aligned so that their long axes are all parallel and these beans are then grouped together, the quantity of beans of each group being that which is required to fill a can. It is also necessary to bring the bean ends at each end of each group of beans into a common plane before they are loaded into cans, otherwise beans are smashed during the canning operation. The machine of the present invention is designed to accomplish these several functions in the time interval between delivery of the beans from the end cutter and the placement of the standard length beans on a conveyor which takes them to the apparatus that loads the beans endwise into cylindrical cans. The can loading apparatus (not shown) is not part of the present invention.

The general organization of the aligner conveyor of the present invention is illustrated in FIG. 1. Beans to be processed are deposited into a hopper A, raised by an elevator conveyor B and deposited in the conical hopper of an end cutter C. The cutter C trims the ends of the beans so that all full length beans are trimmed to a length slightly less than that of the cans. A cutter suitable for this purpose is disclosed in the patent to Mencacci, No. 2,770,274. After the ends are cut, the beans drop onto the aligner conveyor D of the present invention. After the beans have been aligned so that their axes are parallel and their ends in common planes, they are deposited in the cups F of a cup conveyor E for transport to the machine that compacts or rounds off each group of beans and inserts them into the cans. The quantity of beans in each cup is checked visually by an operator who makes up shortages and takes out overages in each cup. An apparatus for compacting beans and inserting them into cans is described and claimed in the co-pending application of H. M. Brownlee et al., Serial No. 835,136, filed August 20, 1959, and also assigned to the assignee of the present application. The canning apparatus (not shown) for operation in conjunction with the machine of the present invention is such that motion of the cup conveyor is controlled by the operator by means not shown, to advance the cup conveyor one flight when the operator deems a cup to be properly filled.

The aligner conveyor assembly D of the present invention comprises a main conveyor G having two spaced parallel belts more fully described hereinbelow. A first aligner conveyor H (FIGS. 2, 3B and 4) is mounted between the belts of the main conveyor G adjacent the pick up end thereof. A second aligner conveyor I is mounted between the belts of the main conveyor G and is spaced forwardly from the first aligner conveyor H. Two end straightener conveyors J and K are mounted adjacent the opposite sides of the main conveyor G in the zone of the second aligner conveyor I. A two belt delivery conveyor L is mounted adjacent the discharge end of the main conveyor G to receive the beans discharged therefrom, and deposit them in the cups F of the cup conveyor E (FIG. 1), without disturbing their relative alignment.

The aligner conveyor D of the present invention comprises a frame 12 (FIG. 2) having vertical legs 13 and including two parallel spaced L-shaped side rails 14 and 16, having base portions 14a and 16a (FIG. 3B). The side rails 14 and 16 are maintained in spaced relation by a plurality of cross braces 18 (FIG. 2), connected therebetween adjacent legs 13. In order to mount the main drive shaft, two plates 20 and 22 are fastened to the vertical flanges of side rails 14 and 16, respectively, by spacers 20a and 22a (FIG. 3A).

The main conveyor assembly G is driven from a main drive shaft 24 rotatably mounted in the plates 20 and 22 and extending transversely therebetween. The drive shaft 24 carries two spaced grooved driving pulleys 26 and 28 for driving round conveyor belts, as will be described presently.

In order to mount idler pulleys at the input end of the machine, a side plate 30 is adjustably secured to the vertical flange of the side rail 14 by nuts 32 and 34 screwed onto two studs 33 and 35 which are fixed to side rail 14 and project through a longitudinal slot 36 formed in the plate 30. A stub shaft 38 is fixed to the plate 30 and a grooved idler pulley 40 is rotatably mounted on the shaft.

A side plate 42 is similarly adjustably secured to the end of the side rail 16, and carries a fixed stub shaft 44 upon which a grooved idler pulley 46 is rotatably mounted.

A round conveyor belt 48 is trained around driving pulley 26 and idler pulley 40, and a second round conveyor belt 50 is trained around driving pulley 28 and idler pulley 46. The tension in the belts 48 and 50 is individually adjusted by longitudinal movement of the plates 30 and 42, respectively.

The first aligner conveyor H is driven from a drive shaft 60 which is rotatably mounted in the side rails 14 and 16 and extends transversely therebetween. A driving roller 62 is fixed to the shaft 60 between the side rails 14 and 16. As seen in FIGS. 3B and 4, in order to mount an idler for the first aligning conveyor, a bracket 70 is bolted to angles 71 secured to side rails 14 and 16 and extends transversely between the ends of the side rails. A longitudinal arm 72 projects from bracket 70 and receives a telescoping strut 72a that projects outwardly therefrom parallel to the side rails 14 and 16. A locking stud 74, for locking the strut 72a in adjusted position, projects outwardly through a slot 76 formed in the plate 30. The strut 72a rotatably carries a shaft 78 at its outer end. Two idler rollers 80 and 82 are fixed to the shaft 78, one on each side of the strut 72.

A flat conveyor belt 84 is trained around the driving roller 62 and the idler rollers 80 and 82, The conveyor belt 84 is provided with a plurality of flights 86. Two additional idler rollers 88 and 90 (FIG. 4) are rotatably mounted on stub shafts 92 and 94, respectively, secured to the side rails 14 and 16. Rollers 88 and 90 support the upper run of the conveyor 84 so that the flights 86 thereon project above the plane of the round conveyor belts 48 and 50 of the main conveyor G.

The drive mechanism for main conveyor G and the first aligner conveyor H includes a motor 100 (FIGS. 1, 2 and 4) and a chain 102 which connects the drive sprocket 104 of the motor 100 to a sprocket 106 fixed to the drive shaft 60 of the first aligner conveyor H. A second sprocket 108 on the shaft 60 is connected by a chain 110 to a sprocket 112 fixed to the drive shaft 24 of the main conveyor G. The chain 110 also engages a sprocket 114 on a drive shaft 116 for the two end straightener conveyors, more fully described below, which shaft is rotatably supported by and extending transversely beneath the side rails 14 and 16. The chain 110 also passes over an idler sprocket 118 adjustably mounted side rail 14.

The diameter ratio between the sprocket 108 (FIG. 2) on the drive shaft 60 that mounts the drive roller 62 (FIG. 4) of the first aligner conveyor H and the sprocket 112 on the drive shaft 24 of the main conveyor G is such that the first aligner conveyor H travels slower than the main conveyor G for reasons explained hereinbelow.

The second aligner conveyor I comprises a drive shaft 120 (FIG. 4) rotatably mounted between side rails 14 and 16 adjacent the drive shaft 24 of the main conveyor G. As seen in FIG. 3A, a chain 122 connects a sprocket 124 on the main conveyor drive shaft 24 with a sprocket 126 on the drive shaft 120 of the second aligner conveyor I. The ratio of the sprockets 124 and 126 is such that the drive shaft 120 of the second aligner conveyor I turns slower than the drive shaft 24 of the main conveyor G.

A drive roller 128 (FIG. 4) is fixed to the shaft 120, and as seen in FIG. 3A, roller 128 is mounted between the belts 48 and 50 of the main conveyor G. An idler roller 130 is rotatably mounted on a fixed shaft 131 (FIGS. 3A and 4) which extends between the side rails 14 and 16. As seen in FIGS. 2 and 3A, the shaft 131 is adjustably mounted by threaded screw means 131a. A flat conveyor belt 132 is trained around the rollers 128 and 130. The conveyor belt 132 is provided with a plurality of upstanding flights 134. The upper run of the conveyor belt 132 passes over an idler roller 136 (FIG. 4) which is eccentrically mounted for free rotation on a shaft 138 fixed between the side rails 14 and 16, in order to vibrate the belt 132, and assist in aligning the beans. Due to the ratio between the sprockets 124 and 126 (FIG. 3A), the belt 132 of the second aligner conveyor I travels slower than do the belts 48 and 50 of the main conveyor G. As best seen in FIG. 3A, adjacent the second aligner conveyor I, the two belts 48 and 50 of the main conveyor G rest on and are supported by two supporting shelves 140 and 142 fixed to the vertical walls of the side rails 14 and 16 by brackets 140a and 142a, respectively. As seen in FIG. 4, the support shelves 140 and 142 maintain the belts 48 and 50 so that their uppermost surfaces are below the upper edges of the flights 134 on the second aligner conveyor belt 132.

As seen in FIGS. 2 and 3A, the end straightener conveyor J comprises a vertical shaft 150 rotatably mounted in a bracket 152 fixed to the outer surface of the side rail 14. A set of bevel gears (not shown) connects the shaft 150 to the previously mentioned drive shaft 116 for counterclockwise rotation as viewed in FIG. 3A. A drive roller 158 is secured to the upper portion of the shaft 150. An idler roller 160 is rotatably mounted on a shaft 162 mounted on a bracket 164 which is adjustably secured to the side rail 14 by a stud 166 (FIG. 2) which projects through a slot 168 in the bracket 164. The shaft 162 is mounted on bracket 164 for lateral movement with respect to the bracket, the lower end of shaft 162 projecting through a laterally extending slot 170 (FIG. 3A) formed in the bracket 164. A flat conveyor belt 172 is trained around rollers 158 and 160.

The second end straightener conveyor K comprises a shaft 180 vertically mounted in a bracket 182 fixed to the outer surface of the side rail 16 and is connected by a set of bevel gears 184 and 186 (FIG. 4) to the previously mentioned drive shaft 116 for clockwise rotation of the shaft 180 as viewed in FIG. 3A. A drive roller 188 is fixed to the upper portion of the shaft 180. An idler roller 190 is rotatably mounted on a shaft 192 which projects through a laterally extending slot 194 (FIG. 3A) in a bracket 196 fixed to the outer surface of the guide rail 16. A second flat conveyor belt 198 is trained around the rollers 188 and 190. The idler rollers 160 and 190 of the end straightener conveyors J and K are adjustable so that the conveyor belts 172 and 198 converge toward each other as they move to the left as viewed in the drawings. The end straightener conveyors J and K travel at the same speed as does the main conveyor G.

The delivery conveyor L comprises a drive roller 200 (FIG. 4) fixedly mounted on the drive shaft 24 of the main conveyor G. As seen in FIG. 3A, drive roller 200 is disposed between the grooved pulleys 26 and 28 that drive the belts 48 and 50 of the main conveyor G. An idler roller 202 (FIGS. 2 and 4) is rotatably mounted on a shaft 204 which extends between the two side plates 20 and 22 adjacent the lower ends thereof. A first delivery conveyor belt 206 is trained around the rollers 200 and 202.

In order to mount a second delivery conveyor belt, two arms 210 and 212 are fixed to the plates 20 and 22 and extend upwardly and forward therefrom. A shaft 214 is mounted between arms 210 and 212 adjacent the upper ends thereof. An idler roller 216 is rotatably mounted on the shaft 214. As best seen in FIGS. 2 and 4, two arms 218 and 220 are pivotally mounted on and depend from the shaft 214 adjacent the arms 210 and 212, respectively. A drive shaft 222 is adjustably mounted between the depending arms 218 and 220 adjacent the lower ends thereof. A drive roller 224 is mounted on the shaft 222 for rotation therewith. A second flat conveyor belt 226 is trained around the idler roller 216 and the drive roller 224.

A drive chain 230 for belt 226 of the delivery conveyor (FIGS. 2 and 3A) engages a sprocket 232 on the drive shaft 24 of the main conveyor G and is trained around a sprocket 234 on the shaft 222 to drive the belt 226. The drive chain 230 is trained around a fixed idler sprocket 236 and around an adjustably mounted idler sprocket 238 (FIG. 2) carried by an arm 240 which is pivotally mounted by a shaft 242 fixed to the plate 20. The belt 226 is spring urged toward belt 206 for controlled resilient engagement with the beans. To accomplish this, an arm 244 is fixed to the arm 240 and a spring 246 is connected between the outer end of the arm 244 and the plate 20. Spring 246 tends to rotate the arm 240 counterclockwise as viewed in FIG. 2 to maintain tension on the chain 230 and to urge the second conveyor belt 226 in close engagement with the first conveyor belt 206. A stop screw 248 (FIG. 4) is threaded into an ear 250 on plate 22. The end of screw 248 engages a lug 252 on depending arm 220, and so controls the position of belt 226 relative to belt 206.

In the operation of the machine, beans are dumped into the hopper A and are carried upwardly by the conveyor B and deposited in the hopper of the end cutter C. The end cutter trims the ends from the beans and cuts the beans to approximately four inches in length. The cut beans are dropped from the end cutter C onto the main conveyor G and first aligner conveyor H of the aligner conveyor assembly D. The fast moving conveyor belts 48 and 50 of the main conveyor G move the beans to the left and crowd them against the back sides of the flights 86 on the slower moving first aligner conveyor H, thus tending to align the beans transversely of the conveyor system. It is obvious that the same effect can be created by driving the first aligner conveyor H faster than the belts 48 and 50 of the main conveyor G. In this instance the beans would be aligned against the front of the flights 86. Some of the grossly misaligned beans and the short beans drop between the belt 84 of the first aligner conveyor and belts 48 and 50 of the main conveyor (FIG. 3B), into a suitable hopper or conveyor (not shown) located beneath the first aligner conveyor H. Those misaligned and short beans which land on the first aligned conveyor H and thus are carried on further, are carried over the end of the aligner to fall in the same hopper or conveyor. When the beans reach the area of the belts 172 and 198 of the end straightener conveyors J and K these belts contact the ends of the beans that are not laterally centered and move them laterally to align all of the bean ends at each end of each group of beans in the same plane.

The beans now have their ends disposed substantially in two parallel planes by belts 172 and 198 but some beans may not lie exactly perpendicular to their direction of travel. This is corrected when the beans are carried by main conveyor belts 48 and 50 to the second aligner conveyor I, the latter having a linear speed that is less than that of the main conveyor G. The eccentric roller 136 beneath the conveyor belt 132 of the second aligner conveyor I causes vibration of that conveyor belt to help in the alignment of the beans, which are crowded by the faster moving belts 48 and 50 of the main conveyor G against the back sides of the flights 134 on the belt 132 of the slower moving second aligner conveyor I. When the beans reach the delivery end of the conveyor belts 48 and 50 of the main conveyor G they clear the second aligner conveyor I and are carried between the belts 226 and 206 of the delivery conveyor L under a resilient pressure controlled by stop screw 248. The beans are moved downwardly and deposited in the cups F of the cup conveyor E, which carries the beans to the canning machinery. Since belts 226 and 206 run at the same speed, they maintain the bean alignment. The ends of the group of beans in each cup are in common planes and the beans are axially aligned for compacting and insertion into cans.

While a preferred embodiment of the invention has been described herein, various changes may be made therein without departing from the spirit of the invention as defined in the appended claims.

The invention having thus been described, what is claimed and desired to be secured by Letters Patent is:

1. An aligner conveyor for elongate articles comprising two relatively narrow main conveyor belts in parallel spaced relation with each other, a flat conveyor belt between said narrow belts, a plurality of transverse flights on said flat conveyor belt that project above said main conveyor belts, and means for driving said belts so that said flat belt travels in the same direction as but at a different speed than that of said narrow belts in order to crowd the articles against said flights and bring the articles into parallelism, said two laterally spaced conveyor belts extending beyond the discharge end of said flat conveyor belt whereby the shorter articles and the articles which are so positioned that they cannot be aligned are enabled to drop between said two laterally spaced conveyor belts.

2. An aligner conveyor for elongate articles comprising two relatively narrow conveyor belts in parallel spaced relation with each other, a flat conveyor belt between said narrow belts, a plurality of transverse flights on said flat conveyor belt that project above said narrow belts, means for driving said flat conveyor belt in the same direction as but at a different speed than that of said narrow belts in order to crowd the articles against said flights, a pair of vertical flat conveyor belts one mounted adjacent each side of said narrow belts, and means for driving said vertical belts in the same direction and at the same speed as said narrow belts, said vertical belts being mounted in converging relation with each other in order to bring the ends of the articles in common planes.

3. A bean aligner conveyor comprising two relatively narrow conveyor belts in parallel spaced relation with each other, a first flat conveyor belt between said narrow belts adjacent the pick up ends thereof, a plurality of flights on said first flat conveyor belt projecting above said narrow belts, means for driving said belts so that said first flat belt travels in the same direction as but at a different speed than that of said narrow belts, a second flat conveyor belt between said narrow belts adjacent the discharge end thereof and spaced longitudinally from said first flat belt, a plurality of flights on said second flat conveyor belt projecting above said narrow belts, and means for driving said second flat conveyor belt in the same direction as but at a different speed than that of said narrow belts.

4. An aligner conveyor for elongate articles comprising two relatively narrow conveyor belts in parallel spaced relation with each other, a flat conveyor belt between said narrow belts, a pluraltiy of flights on said flat conveyor belt projecting above said narrow belts, means for driving said belts so that said flat belt travels in the same direction as but at a different speed than that of said narrow belts, a pair of opposed substantially vertically traveling belts adjacent the discharge end of said narrow belts for receiving therebetween articles discharged from said narrow belts and means for driving said substantially vertically traveling belts at the same speed.

5. An aligner conveyor for elongate articles comprising two relatively narrow conveyor belts in parallel spaced relation with each other, a flat conveyor belt between said narrow belts, a plurality of flights on said flat conveyor belt that project above said narrow belts, means for driving said flat conveyor belt in the same direction as but at a different speed than that of said narrow belts, a pair of vertical flat conveyor belts one mounted adjacent each side of said narrow belts, means for driving said vertical belts in the same direction as and at the same speed as that of said narrow belts, said vertical belts being mounted in converging relation with each other, a pair of opposed substantially vertically traveling belts adjacent the discharge end of said narrow belts for receiving therebetween articles discharged from said narrow belts, and means for driving said substantially vertically traveling belts at the same speed.

6. An aligner conveyor for elongate articles comprising two relatively narrow conveyor belts in parallel spaced relation with each other, a first flat conveyor belt between said narrow belts adjacent the pick up ends thereof, a plurality of flights on said first flat conveyor belt that project above said narrow belts, means for driving said belts so that said first flat belt travels in the same direction as but at a different speed than that of said narrow belts, a second flat conveyor belt between said narrow belts adjacent the discharge end thereof and spaced longitudinally from said first flat belt, a plurality of flights on said second flat conveyor belt that also project above said narrow belts, means for driving said second flat conveyor belt in the same direction as but at a different speed than that of said narrow belts, a pair of opposed substantially vertically traveling belts adjacent the discharge end of said narrow belts adapted to receive therebetween articles discharged from said narrow belts, and means for driving said substantially vertically traveling belts at the same speed.

7. A bean aligner conveyor comprising two relatively narrow conveyor belts in parallel laterally spaced relation with each other, said belts having horizontal reaches, a flat conveyor belt between said narrow belts, a plurality of flights on said flat conveyor belt that project upwardly past the horizontal reaches of said spaced belts, and means for driving said belts so that said flat belt travels in the same direction as but slower than said narrow belts in order to crowd the beans against the flights of said flat conveyor belt and thus bring the axes of the beans into parallelism, said two laterally spaced conveyor belts extending beyond the discharge end of said flat conveyor belt whereby the shorter articles and the articles which are so positioned that they cannot be aligned are enabled to drop between said two laterally spaced conveyor belts.

8. A bean aligner conveyor comprising two relatively narrow conveyor belts having horizontal reaches in parallel laterally spaced relation with each other, a flat conveyor belt between said narrow belts, a plurality of flights on said second flat conveyor belt that project upwardly past said reaches of the narrow belts, means for driving said flat conveyor belt in the same direction as but slower than said narrow belts, a pair of vertical flat conveyor belts are mounted adjacent each side of said narrow belts, and means for driving said vertical belts in the same direction as and at the same speed as that of said narrow belts, said vertical belts being mounted in converging relation with each other toward their discharge ends in order to bring the ends of the beans in common planes.

9. A bean aligner conveyor comprising two relatively narrow conveyor belts having substantially horizontal reaches that are disposed in parallel laterally spaced relation with each other, a flat conveyor belt between said narrow belts, a plurality of flights on said flat conveyor belt that project upwardly past said narrow belts, means for driving said flat conveyor belt in the same direction as but slower than said narrow belts in order to crowd beans against said flights and align their axes, a pair of vertical flat conveyor belts one mounted adjacent each side of said narrow belts, means for driving said vertical belts in the same direction and at the same speed as said narrow belts, said vertical belts being mounted in converging relation with each other for bringing the ends of the beans in common planes, a pair of opposed substantially vertically traveling belts adjacent the discharge end of said narrow belts adapted to receive therebetween articles discharged from said narrow belts, and means for driving said vertically traveling belts at substantially the same speed.

10. A bean aligner conveyor comprising two relatively narrow conveyor belts having horizontally extending reaches in parallel spaced relation with each other, a first flat conveyor belt between said narrow belts adjacent the pick up ends thereof, a plurality of flights on said first flat conveyor belt that project upwardly past said reaches of the narrow belts, means for driving said belts so that said first flat belt travels in the same direction but slower than said narrow belts in order to crowd beans against said flights and align their axes, a second flat conveyor belt between said narrow belts adjacent the discharge end thereof and spaced longitudinally from said first flat belt, a plurality of flights on said second flat conveyor belt that project upwardly past said reaches of the narrow belts, means for driving said second flat conveyor belt in the same direction but slower than said narrow belts in order to crowd beans against said latter flights and further align the bean axes, a pair of vertical flat conveyor belts one mounted adjacent each side of said narrow belts adjacent the discharge end thereof, means for driving said vertical belts in the same direction and at the same speed as said narrow belts, said vertical belts being mounted in converging relation with each other in order to bring the ends of the beans into common planes, and a pair of opposed substantially vertically traveling belts adjacent the discharge end of said narrow belts adapted to receive therebetween articles discharged from said narrow belts.

References Cited in the file of this patent

UNITED STATES PATENTS

| | | |
|---|---|---|
| 1,733,221 | Fuller | Oct. 29, 1929 |
| 2,816,647 | Ruth | Dec. 17, 1957 |